United States Patent

Menon et al.

[11] Patent Number: 5,894,656
[45] Date of Patent: Apr. 20, 1999

[54] METHODS OF FABRICATING ELECTROCHEMICAL CELLS

[75] Inventors: Krishna Menon; Wayne T. Rundle, both of Henderson, Nev.

[73] Assignee: Valence Technology, Inc., Henderson, Nev.

[21] Appl. No.: 08/840,089

[22] Filed: Apr. 11, 1997

[51] Int. Cl.$^6$ .................................................. H01M 2/16
[52] U.S. Cl. ........................ 29/623.1; 429/162; 429/251
[58] Field of Search ............................... 429/162, 251, 429/253, 254; 29/623.5

[56] References Cited

U.S. PATENT DOCUMENTS

| | | | |
|---|---|---|---|
| 5,100,746 | 3/1992 | Muller et al. | 29/623.5 X |
| 5,418,091 | 5/1995 | Gozdz et al. | 429/254 X |
| 5,605,548 | 2/1997 | Itou et al. | 29/623.5 X |
| 5,607,485 | 3/1997 | Gozdz et al. | 429/254 X |

*Primary Examiner*—Stephen Kalafut
*Attorney, Agent, or Firm*—Burns, Doane, Swecker & Mathis, L.L.P.

[57] ABSTRACT

Electrochemical cells with improved adhesion of the laminant components can be fabricated by forming an electrode directly on the surface of electrolyte or separator film. This process obviates the need to prepare the anode or cathode in a separate procedure.

25 Claims, 1 Drawing Sheet

METHODS OF FABRICATING ELECTROCHEMICAL CELLS

FIELD OF THE INVENTION

The present invention relates to electrochemical devices and, more particularly, to methods of laminating the anode, cathode and solid electrolyte or separator layer to form an electrochemical cell or battery.

BACKGROUND OF THE INVENTION

Electrochemical cells comprise a cathode, an anode and an electrolyte interposed therebetween. The electrochemical cells are often defined as liquid or solid cells and this refers merely to whether the electrolyte interposed between the anode and the cathode is a liquid or a solid. Solid electrochemical cells are well known in the art and present many advantages over conventional liquid batteries such as improved safety features, lighter weight, etc. Non-aqueous lithium electrochemical cells are discussed in U.S. Pat. Nos. 4,472,487, 4,668,595, 5,028,500, 5,441,830, 5,460,904, and 5,540,741.

The anode comprises a compatible anodic material which is any material which functions as an anode in an electrochemical cell. Such compatible anodic materials are well known in the art and include, by way of example, lithium, lithium alloys, such as alloys of lithium with aluminum, mercury, nickel, zinc, and the like, and intercalation based anodes such as carbon, $WO_3$, and the like.

The cathode comprises a compatible cathodic material which refers to any material which functions as a positive pole (cathode) in an electrochemical cell. Such compatible cathodic materials are well known in the art and include, by way of example, manganese dioxide, molybdenum trioxide, sulfides of titanium and niobium, chromium oxide, copper oxide, vanadium oxides such as $V_2O_5$, $V_6O_{13}$, $LiV_3O_8$ and the like. The particular compatible cathodic material employed is not critical. When the electrochemical cell is a secondary cell, then the compatible cathodic material employed is one which is capable of being recharged (e.g., $LiV_3O_8$, $V_6O_{13}$, $MoO_3$, and the like).

Composite electrode refers to cathodes and anodes wherein the cathode is comprised of materials other than compatible cathodic materials and the anode is comprised of materials other than compatible anodic materials. Typically, the composite electrode contains a polymer which acts to bind the composite materials together and an electrolytic solvent. Composite electrodes are well known in the art. For example, a composite cathode can comprise a compatible cathodic material, a conductive material, an electrolytic solvent, an alkali salt, and a solid matrix forming polymer. Similarly, for example, a composite anode can comprise a compatible intercalation anodic material, an electrolytic solvent and a solid matrix forming polymer.

When fabricating electrochemical cells comprising composite electrodes, the anode is typically prepared by applying an anode mixture comprising a polymer, an anodic material and a carrier solvent to a substrate and then allowing the carrier solvent to evaporate or "air dry" to form an anode film. The anode film is then laminated onto a current collector to form the anode. Alternatively, the anode mixture can be applied directly to a current collector and the carrier solvent allowed to evaporate to form the anode. The cathode is typically prepared in a similar manner from a cathode mixture comprising a polymer, a cathode active material and a carrier solvent. Similarly, the separator is typically prepared by applying a layer of polymer mixture onto a substrate and allowing the solvent to evaporate. After cutting these components to the appropriate sizes and separating the substrates therefrom, the anode, separator, and cathode are laminated together.

Although this method of preparing electrochemical cells has been satisfactory, this technique tends to be expensive and time consuming. Accordingly, the art is in search of improved techniques of fabricating electrochemical cells that are cost effective and particularly suited for mass production.

SUMMARY OF THE INVENTION

The present invention is directed to a method of fabricating electrochemical cells with improved adhesion of the laminant components wherein the anode and cathode films are formed on the surface of a solid electrolyte or separator layer.

In one aspect, the invention is directed to a method of preparing an electrode/separator assembly that includes the steps of:

(a) preparing a polymer mixture comprising a first polymer, a first solvent, and a first plasticizer;

(b) applying a layer of the polymer mixture onto a first substrate and removing first solvent from the layer of polymer mixture to form a coated substrate having a first polymer matrix film coated on the first substrate;

(c) preparing an electrode mixture comprising an electrode active material, a second polymer, a second solvent, and a second plasticizer;

(d) applying a layer of the electrode mixture onto the first polymer matrix film and removing second solvent from the layer of electrode mixture to form a first electrode/separator bi-layer having a first electrode film coated on the first polymer matrix film; and (e) attaching a current collector onto the first electrode film.

In a preferred embodiment, the polymer mixture includes fumed silica, fumed alumina or other suitable inorganic filler material that helps create a porous film. In addition, the filler imparts toughness and strength to the separator film and prevents film shrinkage.

In another aspect, the invention is directed to a method of fabricating an electrochemical cell comprising the steps of:

(a) preparing an anode by a process comprising:

(i) preparing a polymer mixture comprising a first polymer, a first solvent, and a first plasticizer;

(ii) applying a layer of the polymer mixture onto a first substrate and removing first solvent from the layer of polymer mixture to form a coated substrate having a first polymer matrix film coated on the first substrate;

(iii) preparing an anode mixture comprising an anode active material, a second polymer, a second solvent, and a second plasticizer;

(iv) applying a layer of the anode mixture onto the first polymer matrix film and removing second solvent from the layer of anode mixture to form a first anode/separator bi-layer having a first anode film coated on the first polymer matrix film;

(v) attaching an anode current collector onto the first anode film;

(vi) repeating steps (ii) through (iv) to form a second anode/separator bi-layer having a second polymer matrix film that is coated on a first side with a second anode film and that is coated on the second side with a second substrate; and (vii) attaching said anode current collector onto the second anode film to form an anode comprising an anode current collector having two sides wherein one side is attached to the first anode film of the first anode/separator bi-layer and the other side is attached to the second anode film of the second anode/separator bi-layer;

(b) preparing a cathode by a process comprising:

(i) applying a layer of the polymer mixture onto a second substrate and removing first solvent from the layer of polymer mixture to form a coated substrate having a third polymer matrix film coated on a third substrate;

(ii) preparing a cathode mixture comprising a cathode active material, a third polymer, a third solvent, and a third plasticizer;

(iv) applying a layer of the cathode mixture onto the third polymer matrix film and removing third solvent from the layer of cathode mixture to form a first cathode/separator bi-layer having a first cathode film coated on the third polymer matrix film;

(v) attaching a cathode current collector onto the first cathode film;

(vi) repeating steps (i) through (iv) of step (b) to form a second cathode/separator bi-layer having a fourth polymer matrix film that is coated on a first side with a second cathode film and that is coated on the second side with a fourth substrate; and (viii) attaching said cathode current collector onto the second cathode film to form a cathode comprising a cathode current having two sides wherein one side is attached to the first cathode film of the first cathode/separator bi-layer and the other side is attached to the second cathode film of the second cathode/separator bi-layer;

(c) adding an electrolyte solution comprising an electrolyte solvent and a salt into the first, second, third and fourth polymer matrix films;

(d) removing the substrate from the first polymer matrix film and the third substrate from the third polymer matrix film; and (e) attaching the first polymer matrix film to the third polymer matrix film.

In a preferred embodiment, the anode active material comprising an intercalation carbon the is selected from the group consisting of graphite, coke, mesocarbon, and mixtures thereof, and the cathode active material is selected from lithiated manganese oxides, lithiated cobalt oxides, lithiated nickel oxides, and mixtures thereof. The inventive process obviates the need of fabricating the anode and cathode in a separate step whereby (1) an electrode mixture comprising an electrode active material and solvent is applied onto a substrate, (2) solvent is removed, (3) the electrode/substrate is cut to size, and (4) the substrate removed from the electrode layer.

DETAILED DESCRIPTION OF THE PREFERRED EMBODIMENTS OF THE INVENTION

Figure 1:
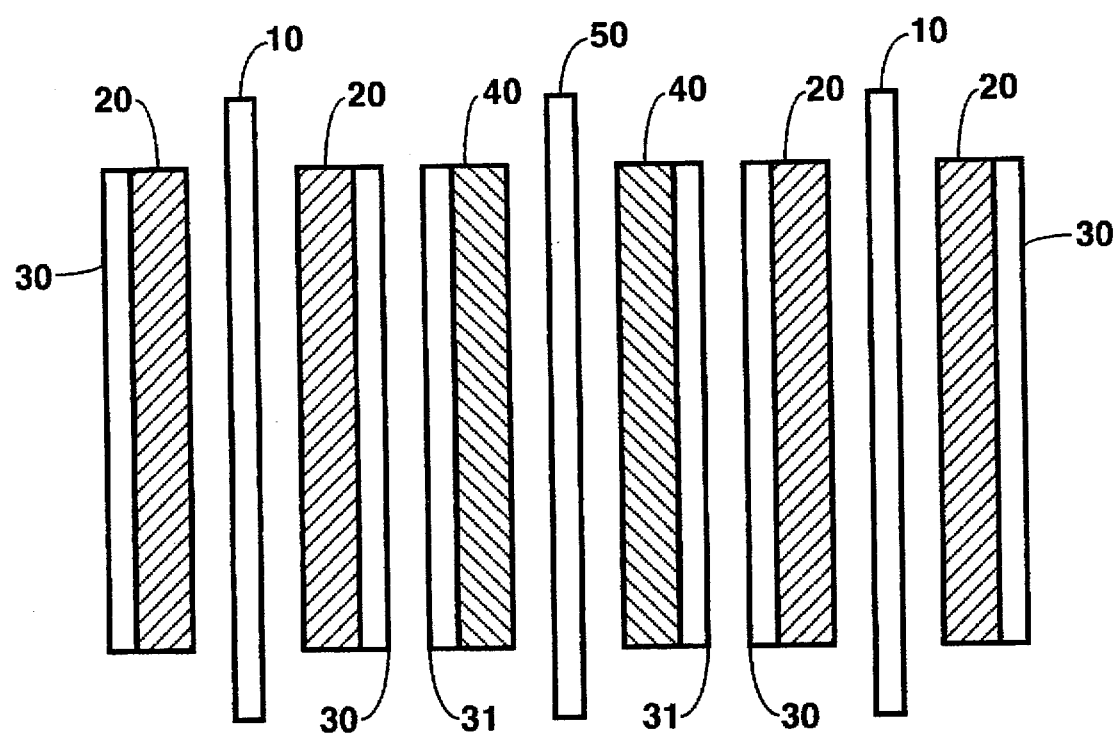
FIG. 1 is a schematic view of a view of an electrochemical cell assembly stack prior to lamination.

The present invention is directed to a method of preparing composite electrodes and electrolyte or separator layers suitable for use in electrochemical devices, and particularly for use in electrochemical cells and batteries.

Preferred electrochemical cells include: a composite cathode comprising an active material and polymeric binder, a composite anode comprising an intercalation based carbon anode and polymeric binder, with each electrode capable of reversibly incorporating (e.g., intercalating) an alkali metal ion, and an electrolyte comprising a polymeric matrix containing an electrolyte solution comprising an organic electrolyte solvent and a salt of the alkali metal. At least one of the composite electrodes has a current collector that is coated with a layer of an electrically conductive polymeric adhesive material that is positioned between the composite electrode and current collector. Preferably, both composite electrodes are so constructed. The layer of electrically conductive polymeric adhesive material significantly improves the adhesion of the current collector to the composite electrode which results in a reduction in the impedance for the electrochemical cell and battery. The composite electrode remains substantially and permanently attached to the layer of electrically conductive polymeric adhesive material during the life of the electrochemical cell or battery. Particularly preferred electrochemical cells and batteries use lithium and salts thereof.

The anode generally comprises an anode film that is laminated onto one or both sides of the current collector. Typically, each anode film is from about 100 µm to about 250 µm in thickness, preferably about 110 µm to about 200 µm, and more preferably about 125 µm to about 175 µm. Similarly, the cathode comprises a cathode film that is laminated onto one or both sides of the current collector. Typically, each cathode film is from about 100 µm to about 200 µm in thickness, preferably about 130 µm to about 175 µm, and more preferably about 140 µm to about 165 km.

The current collectors comprise, for example, a screen, grid, expanded metal, foil, woven or non-woven fabric or knitted wire formed from an electron conductive material such as metals or metal alloys. The term "current collector" refers to any suitable metallic current collector. Current collectors in the form of grids are preferred. Preferably, the current collector has a thickness from about 25 µm to about 75 µm, preferably about 35 µm to about 65 µm, and more preferably about 45 µm to about 55 µm. Each current collector is also preferably connected to a current collector tab which extends from the edge of the current collector. In batteries comprising multiple electrochemical cells, the anode tabs are preferably welded together and connected to a nickel lead. The cathode tabs are similarly welded and connected to a lead. External loads can be electrically connected to the leads. Current collectors and tabs are described in U.S. Pat. Nos. 4,925,752, 5,011,501, and 5,326,653, which are incorporated herein.

A critical aspect of the present invention is that in preparing the anode or cathode, the electrode mixture comprising an electrode active material, polymer binder, plasticizer, and solvent is applied onto the solid electrolyte or separator layer.

However, prior to describing this invention in further detail, the following terms will be defined.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of plasticizer including compatibility with the components of the electrochemical cell precursor, processability, low polymer solubility and extractability by dense gases. Preferred plasticizers include, for example, dibutyl phthalate, dioctylphthalate, acetates, glymes, and low molecular weight polymers.

In operation, in fabricating a solid polymeric matrix or composite electrode that includes polymeric binders, for example, the plasticizer is first well mixed with a polymer. Preferably the weight ratio of plasticizer to polymer in this mixture is from about 0.1 to about 50, more preferably about 0.5 to about 25, and most preferably about 1 to about 10. Thereafter the plasticizer is removed by extraction and in the process the porous structure is formed.

The term "electrochemical cell precursor" or "electrolytic cell precursor" refers to the structure of the electrochemical cell prior to the addition of the inorganic salt and electrolyte solution. The precursor typically comprises (each in precursor form) an anode, a cathode, and solid polymeric matrix. The anode and/or cathode may each include a current collector. For a liquid electrolytic cell, a separator made of any suitable material such as, for example, glass fiber, polyethylene, or polypropylene is employed instead of a solid polymeric matrix.

The term "activation" refers to the placement of an inorganic salt and electrolyte solvent into the porous portions of an electrochemical cell precursor. After activation, the electrochemical cell is charged by an external energy source prior to use.

The term "electrolytic cell" or "electrochemical cell" refers to a composite containing an anode, a cathode and an ion-conducting electrolyte interposed therebetween.

The term "battery" refers to two or more electrochemical cells electrically interconnected in an appropriate series/parallel arrangement to provide the required operating voltage and current levels.

The term "solid polymeric matrix" refers to an electrolyte compatible material formed by polymerizing an inorganic or organic monomer (or partial polymer thereof) and which, when used in combination with the other components of the electrolyte, renders the electrolyte solid. Suitable solid polymeric matrices are well known in the art and include solid matrices formed from organic polymers, inorganic polymers or a mixture of organic polymers with inorganic non-polymeric materials. Preferably, the solid polymeric matrix is an organic matrix derived from a solid matrix forming monomer and from partial polymers of a solid matrix forming monomer. See, for example, U.S. Pat. Nos. 5,501,921, 5,498,491, 5,491,039, 5,489,491, 5,482,795, 5,463,179, 5,419,984, 5,393,621, 5,358,620, 5,262,253, 5,346,787, 5,340,669, 5,300,375, 5,294,501, 5,262,253, and 4,908,283, which are incorporated herein. Inorganic monomers are disclosed in U.S. Pat. Nos. 4,247,499, 4,388,385, 4,414,607, 4,394,280, 4,432,891, 4,539,276, and 4,557,985, which are incorporated herein.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can then be added. The mixture is then placed on a substrate and removal of the volatile solvent would result in the formation of a solid electrolyte. In either case, the resulting solid electrolyte would be a homogeneous, single phase product which is maintained upon curing, and does not readily separate upon cooling to temperatures below room temperature.

Preferably, the solid polymeric matrix can be formed by a casting process which does not require the use of monomers or prepolymers, that is, no curing is required. A preferred method employs a copolymer of polyvinylidene difluoride and hexafluoropropylene dissolved in acetone or other suitable solvent. Upon casting the solution, the solvent is evaporated to form the solid polymeric matrix. The solution may be casted directly onto a current collector. Alternatively, the solution is casted onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, $NaSCN$, and the like. The inorganic ion salt preferably contains at least one cation selected from the group consisting of Li, Na, Cs, Rb, Ag, Cu, Mg and K.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. When using propylene carbonate based electrolytes in an electrolytic cell with graphite anodes, a sequestering agent, such as a crown ether, is added in the electrolyte.

For electrochemical cells where (1) the cathode comprises lithiated cobalt oxides, lithiated manganese oxides, lithiated nickel oxides, $Li_xNi_{1-y}Co_yO_2$, where x is preferably about 1 and y is preferably 0.1–0.9, $LiNiVO_4$, or $LiCoVO_4$, and (2) the anode comprises carbon, the electrolytic solvent preferably comprises a mixture of ethylene carbonate and dimethyl carbonate. For electrochemical cells where the cathode comprises vanadium oxides, e.g., $V_6O_{13}$ and the anode is lithium, the electrolytic solvent preferably comprises a mixture of propylene carbonate and triglyme.

The term "organic carbonate" refers to hydrocarbyl carbonate compounds of no more than about 12 carbon atoms and which do not contain atany hydroxyl groups. For example, the organic carbonate can be non-cyclic carbonates or cyclic aliphatic carbonates. Non-cyclic carbonates include, for example, dimethyl carbonate, diethyl carbonate, methyl ethyl carbonate, dipropyl carbonate and bis(2-methoxyethyl) carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3- dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-timethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,β-diol or an alkane-α,γ-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The composite anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. Such carbon intercalation based anodes typically include a polymeric binder and extractable plasticizer suitable for forming a bound porous composite having a molecular weight of from about 1,000 to 5,000,000. Examples of suitable polymeric binders include EPDM (ethylene propylene diamine termonomer), PVDF (polyvinylidene difluoride), (including copolymers thereof), EAA (ethylene acrylic acid copolymer), EVA (ethylene vinyl acetate copolymer), EAA/EVA copolymers, and the like.

Composite anodes preferably comprise a carbon material and a polymeric binder which preferably comprises polymers such as, for example, polyvinylidene difluoride, halogenated hydrocarbon polymers including, for example, poly (vinylidene chloride), poly((dichloro-1,4-phenylene) ethylene), fluorinated urethanes, fluorinated epoxides, fluorinated acrylics, and copolymers thereof. Porous polymer structures are formed when these polymers are first imbued with the plasticizers and then removing the plasticizers therefrom. The composite anode can comprise from about 5% (wt) to about 50% (wt) preferably from about 8% (wt) to about 30% (wt) and more preferably from about 10% (wt) to about 20% (wt) of the polymeric binders. Graphite is a preferred carbon material. The composite anode may also include an electron conducting material such as carbon black.

The composite cathode preferably comprises a compatible cathodic material (i.e., insertion compounds) which is any material which functions as a positive pole in a solid electrolytic cell. Such compatible cathodic materials are well known in the art and include, by way of example, transition metal oxide materials, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$ and mixtures thereof. Cathode-active material blends of $Li_xMn_2O_4$ (spinel) is described in U.S. Pat. No. 5,429,890 which is incorporated herein. The blends can include $Li_xMn_2O_4$ (spinel) and at least one lithiated metal oxide selected from $Li_xNiO_2$ and $Li_xCoO_2$ wherein $0<x \leq 2$. Blends can also include $Li_y$-α-$MnO_2$ ($0 \leq y <1$) that has a hollandite-type structure and is described in U.S. Pat. No. 5,561,007, which is incorporated herein.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1,000 to 5,000,000.

In one preferred embodiment, the composite cathode is prepared from a composite cathode paste which comprises from about 35 to 65 weight percent of a compatible cathodic material; from about 1 to 20 weight percent of an electroconductive agent; from about 1 to 20 weight percent of suitable polymeric binders that may include EPDM (ethylene propylene diene termonomer), PVDF (polyvinylidene difluoride), EAA (ethylene acrylic acid copolymer), EVA (ethylene vinyl acetate copolymer), EAAMEVA copolymers, and the like. Preferably, the composite cathode can comprise from about 3% (wt) to about 50% (wt), preferably from about 8% (wt) to about 30% (wt), and more preferably from about 10% (wt) to about 20% (wt) of the polymeric binder.

The composite cathode further comprises from about 0 to about 20 weight percent of polyethylene oxide having a number average molecular weight of at least 100,000; from about 10 to 50 weight percent of solvent comprising a 10:1 to 1:4 (w/w) mixture of an organic carbonate and a glyme; and from about 5 weight percent to about 25 weight percent of a sold matrix forming monomer or partial polymer thereof. An ion conducting amount of an inorganic ion salt may also be included. Generally, the amount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The electrolyte composition typically comprises from 0 to about 80 weight percent electrolyte solvent based on the total weight of the electrolyte; preferably from about 60 to about 80 weight percent; and even more preferably about 70 weight percent.

A solid electrolyte composition typically comprises from about 5 to about 30 weight percent of the solid polymeric matrix based on the total weight of the electrolyte; preferably from about 15 to about 25 weight percent.

In a preferred embodiment, the solid electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

Methodology

Electrochemical cells are known in the art. See, for example, U.S. Pat. Nos. 5,300,373, 5,316,556, 5,346,385, 5,262,253, 4,472,487, 4,668,595, 5,028,500, 5,584,893, and U.S. patent application Ser. No. 08/630,983, now U.S. Pat. No. 5,746,781 entitled "Method and Apparatus For Preparing Electrochemical Cells" filed Apr. 12, 1996, all of which are incorporated herein. The inventive method can be adapted to prepare anode/electrolyte and cathode/electrolyte cell assemblies suitable for prior art electrochemical devices. In preparing an electrode/cell assembly, the solid electrolyte or separator layer is first prepared by applying a layer of a polymer mixture onto a first substrate and removing solvent from the layer of polymer mixture to form a coated substrate. The separator layer formed is typically about 1 mil (25 µm) thick, preferably about 10 µm to about 100 µm, and more preferably about 10 µm to 25 µm. Preferably the polymer mixture for the separator layer also includes an inert filler material such as, e.g., fumed silica, fumed alumina, or mixture thereof. This forms a film that is more porous and has improved structural integrity. The polymer mixture comprises a polymer, a solvent, and a plasticizer. Next, a layer of electrode mixture is applied onto the polymer matrix of the separator film and removing solvent from the layer of electrode mixture to form a electrode/separator bi-layer or cell assembly having an electrode film coated on the polymer matrix. The electrode mixture comprises an electrode active material, a polymer, a solvent, and a plasticizer. A current collector is attached to the electrode film.

The term "substrate" refers to any suitable film made of material that is compatible with the components of the polymer mixture. The substrate serves as the vehicle or base onto which the electrode mixture is applied. After the solvent has evaporated from the mixture, the polymer matrix is formed. As is apparent, the electrode mixture is applied onto the surface of the polymer matrix that is not attached to the substrate. Suitable substrates include, for example, paper, e.g., 20 or 24 weight paper, polyester (MYLAR™), polypropylene, polyethylene films and non-woven webs.

The inventive process eliminates the need of fabricating the anode and cathode in a separate step whereby (1) an electrode mixture comprising an electrode active material and solvent is applied onto a substrate, (2) solvent is removed, (3) the electrode/substrate is cut to size, and (4) the substrate removed from the electrode layer.

A separator layer can be prepared by applying polymer mixture onto a MYLAR™ substrate. This mixture typically comprises about 1%–10% polymer binder (e.g., copolymer of VDF and HFP), about 2%–15% plasticizer (e.g., dibutyl phthalate), about 0.5%–8% silanized fumed $SiO_2$, and the balance solvent (e.g., acetone) and having a viscosity of about 100 cps–1,000 cps. A thin film of the polymer and plasticizer is formed upon evaporation of the solvent. This film is ready for coating with the anode or cathode slurry formulated as described herein.

The following examples illustrate methods of how an electrolytic cell could be fabricated with the inventive process. Examples 1 and 2 describe the process of preparing the anode and cathodes, respectively. Example 3 describes the procedures for fabricating a solid electrolytic cell.

EXAMPLE 1

The anode slurry is prepared as follows:

A polymer mixture comprising a copolymer of vinylidene difluoride (VDF) and hexafluoropropylene (HFP) is prepared by mixing 23.3 grams of the copolymer in 100 ml of acetone. The copolymer (ave. melt viscosity 23,000–27,000 poise) is Kynar Flex 2801™ from Elf Atochem North America, Philadelphia, Pa. The mixture is stirred for about 24 hours in a milling jar available from VWR Scientific, San Francisco, Calif., catalogue No. H-04172-00. The copolymer functions as a binder for the carbon in the anode.

A graphite mixture is prepared separately by first adding 80 grams of graphite into 3.1 grams of carbon black into a solution containing 200 grams acetone, 36 grams dibutyl phthalate, and 0.5 grams of a surfactant. A preferred graphite comprises a 50:50 (by weight) mixture of a synthetic graphite available under the designation SFG-15™ from Lonza G & T, Ltd. (Sins, Switzerland) and graphitized mesocarbon microbeads available under the designation MCMB25-28™ from Osaka Gas Co., Japan. A preferred carbon black is available under the designation Super P™ from M.M.M. Carbon, Willbroeck, Belgium. The graphite mixture is then vigorously mixed in a high shear mixer until a substantially homogeneous blend is formed. A suitable mixer is available from Ross, Model ME100DLX, Hauppauge, N.Y. operating at a high setting (about 10,000 RPM) for 30 minutes.

The anode slurry is prepared by mixing the polymer mixture and the graphite mixture together under low shear conditions to form the anode slurry wherein the components are well mixed. A portion of the acetone is allowed to evaporate from the slurry before it was laminated onto a separator layer. An anode film forms when the remaining portion of the acetone evaporates.

EXAMPLE 2

The cathode slurry is prepared as follows:

A polymer mixture comprising a copolymer of vinylidene difluoride (VDF) and hexafluoropropylene (HFP) is prepared by mixing 26.7 grams of the copolymer in 100 grams of acetone. The copolymer is Kynar Flex 2801™. The mixture is stirred for about 24 hours in a milling jar.

A cathode active material mixture is prepared separately by first adding 173.4 grams of a cathode-active material of $Li_xMn_2O_4$ (spinel) ($0<x\leq2$), 14.7 grams of carbon black (Super P™) into a solution containing 333.3 grams acetone, 51.9 grams dibutyl phthalate, and 0.9 grams of a surfactant.

The mixture is then vigorously mixed in the a high shear mixer until a substantially homogeneous blend is formed.

A cathode slurry is prepared by mixing the polymer mixture and the cathode active material mixture together under low shear conditions to form the cathode slurry wherein the components are well mixed. A portion of the acetone is allowed to evaporate from the slurry before it is laminated onto the separator layer. A cathode film forms when the remaining portion of the acetone evaporates.

EXAMPLE 3

A solid electrochemical cell is prepared by positioning anode and cathode current collectors between the anode/separator and cathode/separator assembly structures fabricated in Examples 1 and 2, into the configuration shown in FIG. 1 and thereafter fusing the structures under moderate pressure and temperature to form an electrochemical cell precursor. The lamination process causes the binding materials to anneal to create a permanent bond at the anode/separator and cathode/separator interfaces.

As depicted in FIG. 1, the anode/separator assembly comprises anode film 20 which has been formed on the separator layer 30. Similarly, the cathode/separator assembly comprises cathode film 40 which has been formed on separator layer 31. The anode current collector 10 is a sheet of expanded copper metal that is about 50 μm thick. It is available under the designation Delker #2 Cu5-125 (flatten) Delker Corp., Branford, CT. The cathode current collector 50 is a sheet of expanded aluminum that is about 50 μm thick. The aluminum grid is available under the designation 2AL5-077 from Delker Corp.

As is apparent, after lamination, both surfaces of the anode current collector will be coated with an anode layer and both surfaces of the cathode current collector will be coated with a cathode layer. Following extraction of the plasticizer, the battery is activated.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. A method of preparing an electrode/separator assembly that comprises the steps of:
    (a) preparing a polymer mixture comprising a first polymer, a first polymer solvent, and a first plasticizer;
    (b) applying a layer of the polymer mixture onto a first substrate and removing first polymer solvent from the layer of polymer mixture to form a coated substrate having a first polymer matrix film coated on the first substrate;
    (c) preparing an electrode mixture comprising an electrode active material, a second polymer, a second polymer solvent, and a second plasticizer;
    (d) applying a layer of the electrode mixture onto the first polymer matrix film and removing second polymer solvent from the layer of electrode mixture to form a first electrode/separator bi-layer having a first electrode film coated on the first polymer matrix film; and
    (e) attaching a current collector onto the first electrode film.

2. The method of claim 1 wherein the polymer mixture includes an inert filler material.

3. The method of claim 1 wherein the electrode active material is an anode active material comprising an intercalation carbon material.

4. The method of claim 3 wherein the intercalation carbon material is selected from the group consisting of graphite, coke, mesocarbon, and mixtures thereof.

5. The method of claim 1 wherein the electrode active material is a cathode active material.

6. The method of claim 5 wherein the cathode active material is selected from lithiated manganese oxides, lithiated cobalt oxides, lithiated nickel oxides, and mixtures thereof.

7. The method of claim 1 wherein the first and second polymer solvents comprise acetone.

8. The method of claim 1 wherein the first and second polymers comprise a copolymer of vinylidenedifluoride and hexafluoropropylene.

9. The method of claim 1 wherein the substrate is a film or non-woven web made from material selected from the group consisting of paper, polyester, polypropylene, and polyethylene.

10. The method of claim 1 further comprising forming a second electrode/separator bi-layer comprising a second electrode film that is coated onto a second polymer matrix film by repeating steps (b) through (d), and then attaching the second polymer matrix film onto said current collector.

11. The method of claim 10 wherein the electrode active material is an anode active material comprising an intercalation carbon material.

12. The method of claim 11 wherein the intercalation carbon material is selected from the group consisting of graphite, coke, mesocarbon, and mixtures thereof.

13. The method of claim 10 wherein the electrode active material is a cathode active material.

14. The method of claim 13 wherein the cathode active material is selected from lithiated manganese oxides, lithiated cobalt oxides, lithiated nickel oxides, and mixtures thereof.

15. The method of claim 10 wherein the first and second polymer solvents comprise acetone.

16. The method of claim 10 wherein the first and second polymers comprise a copolymer of vinylidenedifluoride and hexafluoropropylene.

17. The method of claim 10 wherein the first substrate is a film or non-woven web made from material selected from the group consisting of paper, polyester, polypropylene, and polyethylene.

18. A method of fabricating an electrochemical cell comprising the steps of:
    (a) preparing an anode by a process comprising:
        (i) preparing a polymer mixture comprising a first polymer, a first polymer solvent, and a first plasticizer;
        (ii) applying a layer of the polymer mixture onto a first substrate and removing first polymer solvent from the layer of polymer mixture to form a coated substrate having a first polymer matrix film coated on the first substrate;
        (iii) preparing an anode mixture comprising an anode active material, a second polymer, a second polymer solvent, and a second plasticizer;
        (iv) applying a layer of the anode mixture onto the first polymer matrix film and removing second polymer solvent from the layer of anode mixture to form a first anode/separator bi-layer having a first anode film coated on the first polymer matrix film;
        (v) attaching an anode current collector onto the first anode film;

(vi) repeating steps (ii) through (iv) to form a second anode/separator bi-layer having a second polymer matrix film that is coated on a first side with a second anode film and that is coated on the second side with a second substrate; and (vii) attaching said anode current collector onto the second anode film to form an anode comprising an anode current collector having two sides wherein one side is attached to the first anode film of the first anode/separator bi-layer and the other side is attached to the second anode film of the second anode/separator bi-layer;

(b) preparing a cathode by a process comprising:

(i) applying a layer of the polymer mixture onto a second substrate and removing first polymer solvent from the layer of polymer mixture to form a coated substrate having a third polymer matrix film coated on a third substrate;

(ii) preparing a cathode mixture comprising a cathode active material, a third polymer, a third polymer solvent, and a third plasticizer;

(iii) applying a layer of the cathode mixture onto the third polymer matrix film and removing third polymer solvent from the layer of cathode mixture to form a first cathode/separator bi-layer having a first cathode film coated on the third polymer matrix film;

(iv) attaching a cathode current collector onto the first cathode film;

(v) repeating steps (i) through (iv) of step (b) to form a second cathode/separator bi-layer having a fourth polymer matrix film that is coated on a first side with a second cathode film and that is coated on the second side with a fourth substrate; and (vi) attaching said cathode current collector onto the second cathode film to form a cathode comprising a cathode current having two sides wherein one side is attached to the first cathode film of the first cathode/separator bi-layer and the other side is attached to the second cathode film of the second cathode/separator bi-layer;

(c) adding an electrolyte solution comprising an electrolyte solvent and a salt into the first, second, third and fourth polymer matrix films;

(d) removing the substrate from the first polymer matrix film and the third substrate from the third polymer matrix film; and (e) attaching the first polymer matrix film to the third polymer matrix film.

19. The material of claim 18 wherein the polymer mixture includes an inert filler material.

20. The method of claim 18 wherein the anode active material comprising an intercalation carbon material.

21. The method of claim 20 wherein the intercalation carbon material is selected from the group consisting of graphite, coke, mesocarbon, and mixtures thereof.

22. The method of claim 21 wherein the cathode active material is selected from lithiated manganese oxides, lithiated cobalt oxides, lithiated nickel oxides, and mixtures thereof.

23. The method of claim 18 wherein the first, second, third, and fourth polymer solvents comprise acetone.

24. The methaod of claim 18 wherein the first, second, third, fourth polymers comprise a copolymer of vinylidenedifluoride and hexafluoropropylene.

25. The method of claim 18 wherein each of the substrates is a film or non-woven web made from material selected from the group consisting of paper, polyester, polypropylene, and polyethylene.

* * * * *